UNITED STATES PATENT OFFICE.

MARIA CHAPMAN, OF DUBOIS, ILLINOIS, ASSIGNOR TO HERSELF AND ANNIE GETCHELL, OF BOSTON, MASSACHUSETTS.

IMPROVEMENT IN REFINING COPPER.

Specification forming part of Letters Patent No. 215,096, dated May 6, 1879; application filed February 17, 1879.

*To all whom it may concern:*

Be it known that I, MARIA CHAPMAN, now or late of Dubois, of the county of Washington, of the State of Illinois, have invented a new and useful Improvement in the Art of Refining and Hardening Copper, and do hereby declare the same to be described as follows.

In carrying out my invention, I make use of a composition consisting of the following ingredients (or their equivalents) in equal or about equal parts, by weight, viz: Clay or steatite; an alkali—as potash, for instance; borate of soda; carbon or carbonaceous matter, such as straw or sawdust; and common glass, all of which, except the glass, are to be mixed and ground finely together prior to being used.

Of the composition I take one pound eight and one-half ounces, avoirdupois, or thereabout, to each three pounds of the metal to be treated.

The crude copper, after being put in a furnace and reduced to a molten state, is to have the refining-composition mixed and stirred into it, after which the whole is to be kept heated and melted for one hour, or thereabout, during which time the glass is to be introduced. I prefer to add the glass separately; but it may be applied with the other ingredients. Next, the dross should be drawn off or separated from the liquid copper, and a little more of the borate of soda should be added to the metal, which, after being suffered to remain in a liquid state for about fifteen minutes, will be ready for being run into molds or formed into ingots.

After it may have been molded, it will be found to have not only been refined, but to be indurated, like the best Norway iron or certain kinds of steel.

What I claim as my invention is—

The improvement, substantially as described, in the art of refining and hardening copper, such being by treating it while it is in a molten state by means of an argillaceous mineral, an alkali, borate of soda, carbon or a carbonaceous matter, and glass, all being essentially as set forth.

MARIA CHAPMAN.

Witnesses:
 ANNIE GETCHELL,
 JOHN WEST.